July 2, 1935.  O. E. BEMBERG  2,007,106
AUTOMATIC AERODYNAMIC STABILIZER FOR AIRPLANES
Filed July 25, 1934
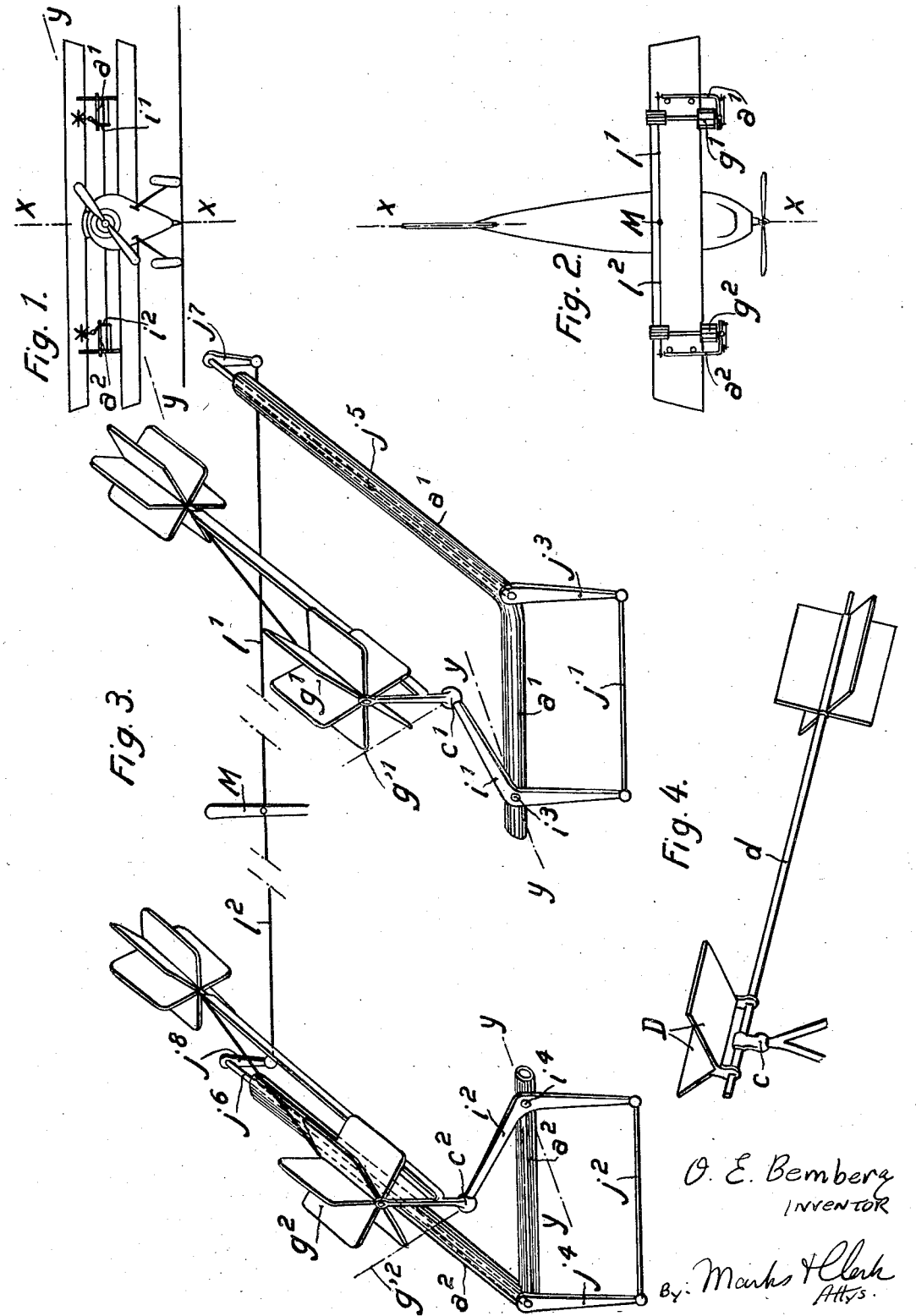
O. E. Bemberg
INVENTOR
By Marks & Clerk
Attys.

Patented July 2, 1935

2,007,106

UNITED STATES PATENT OFFICE 2,007,106

AUTOMATIC AERODYNAMIC STABILIZER FOR AIRPLANES

Otto Eduardo Bemberg, Paris, France

Application July 25, 1934, Serial No. 736,911
In France October 12, 1933

2 Claims. (Cl. 244—29)

The present invention relates to an improvement in the system of stabilizer which forms the subject-matter of the United States Patent No. 1,890,363, dated 6th December 1932.

In the system disclosed in the above patent, the stabilization is obtained by means of a special device, receiving the pressure of the air due to the flight of the airplane, thus causing a vertical upward reaction, the said device being connected to the airplane, but being capable of taking any possible position relatively to the latter, and automatically actuating the stabilizing controls.

In order that the device according to the invention should be compact, the special wind vane, called the "daisy" must be given dimensions as reduced as possible. It is obvious that the ascensional power of this wind vane is so much the more reduced as it is smaller. Moreover, by means of the arrangement described, when the airplane laterally inclines, the tangential component of the ascensional power which tends to restore the wind vane to the vertical position is small and the action on the stabilizing controls is not sufficiently powerful.

The present invention is adapted to remedy this inconvenience. The new improvement substantially consists in arranging, on both sides of the airplane, two symmetrical wind vanes, the spherical or ball pivot members of which are carried by levers bent at about 120°. By means of this arrangement, when the airplane flies horizontally, the actions obtained on the right-hand and on the left-hand sides are equal and annul each other. When the airplane inclines, the wind vane which is located on the side which rises tends to come in alignment with its lever and does not produce any action.

On the contrary, the other wind vane comes near the position in which it would be perpendicular to its lever and produces on the latter a maximum effect. This difference of actions is used for actuating the stabilizing controls. It can be very powerful with small wind vanes, since the lever arm of the bent lever may be given a length as great as desired.

The new improvement is illustrated, by way of example only, in the accompanying diagrammatic drawing, in which:

Fig. 1 is a diagrammatic front view of an airplane provided with the new device.

Fig. 2 is a corresponding plan view.

Fig. 3 is a perspective view showing the new device in greater detail.

Fig. 4 illustrates a constructional modification of the wind vane.

As illustrated in the accompanying drawing, to the right and to the left of the longitudinal plane of symmetry $x$ $x$ of the airplane, are secured, in any suitable manner, supports such as bent tubes $a^1$, $a^2$. Two identical wind vanes $g^1$, $g^2$ are mounted on spherical or ball members $c^1$, $c^2$, carried by levers $i^1$, $i^2$ rotating at $i^3$, $i^4$ on the ends of the tubes $a^1$, $a^2$. These levers are bent at about 120°. Their ends opposed to the spherical or ball members are connected by links $j^1$, $j^2$, to arms $j^3$, $j^4$, rigidly secured on shafts $j^5$, $j^6$, capable of rotating on themselves and carrying other arms $j^7$, $j^8$, connected by links or cables $l^1$, $l^2$ to the control lever M. It is to be noted that the bent levers are substantially bell crank levers and are pivoted at their apices on opposite sides of the machine. Normally the lower portions are arranged vertically while the upper portions extend at an obtuse angle in opposite directions to each other so that owing to the shape of the levers when the airplane inclines the action of one of the wind vanes is rendered very small and that of the other wind vane is on the contrary rendered very powerful.

The operation is as follows:

When the airplane flies in a horizontal position, the wind vanes act equally on their levers and the actions thus produced annul each other since they are equal and of reverse direction.

When the airplane laterally inclines (Fig. 3), assuming for instance an inclination $y$ $y$, both wind vanes move in order to straighten and automatially come in a vertical position relatively to the spherical or ball members, thus taking the position indicated at $g'^1$ and $g'^2$; the wind vane located on the side which rises, for instance $g^2$ in the example shown in the drawing, moves towards the position in which it would be in alignment with the lever $i^2$; consequently, it does not produce any action on this lever or produces only a very small action thereon. On the contrary, the wind vane $g^1$ moves towards the position in which it would be perpendicular to its lever $i^1$, and produces on the latter an effect so much the more multiplied as the arm of the lever is longer. The right-hand and left-hand actions being thus dissymmetrical, the controls $l^1$, $l^2$ act on the control lever M to right the airplane and to automatically produce lateral stabilization.

Owing to this arrangement, the wind vanes can be of very small dimensions and, consequently, they can be light and compact and capable however of exerting sufficient stresses on the controls.

Another improvement forming the subject-matter of the invention is the following:

Experience has shown that with a wind vane constituted and fitted in position as described in the prior patent previously mentioned and the preceding arrangement, it sometimes happens that, at very high speeds, the rear gear of the wind vane becomes tangent to the wind; in this case, the daisy loses its incidence in the wind and comes down flat.

In order to remedy this defective operation, another improvement consists in balancing or loading each wind vane at the rear, so that the rear rudder cannot come tangent to the wind, but that it always remains underneath so as to present the daisy or the dihedron, or other equivalent device obliquely to the wind due to the flight and to ensure in any case the production of an upward pressure on this daisy or dihedron, thus ensuring the raising of the same.

The accompanying diagrammatic drawing shows in Fig. 4 how the wind vane can be constituted by means of a dihedron D carried by a rectilinear spar $d$ pivoted on a spherical or ball member $c$. The rear rudder is similar to that of the patent cited. The whole structure carries a weight so that the rear is loaded and that the dihedron D is always placed with a certain incidence in the wind.

What I claim as my invention and desire to secure by Letters Patent is:—

1. An improvement in automatic aerodynamic stabilizers for airplanes including in combination with an airplane, two substantial bell crank levers pivoted at their apices to the airplane on opposite sides thereof and having their lower portions substantially vertical when in a normal position and having their upper portions extending in opposite directions at an obtuse angle to the lower portion, a wind vane arranged above each of the levers and including a spherical supporting member connected with the outer end of the upper portion of the adjacent bell crank lever so that owing to the shape of the levers, when the airplane inclines the action of one of the wind vanes is rendered very small and that of the other wind vane is on the contrary rendered very powerful.

2. An improvement in a stabilizer as claimed in claim 1 and in combination therewith, a rudder secured to the rear of each of the wind vanes, and means for loading the rudder in order that the rudder cannot come tangent to the wind and that the vane is always presented with an incidence in the wind.

OTTO EDUARDO BEMBERG.